(12) United States Patent
Howe

(10) Patent No.: US 8,127,532 B2
(45) Date of Patent: Mar. 6, 2012

(54) PIVOTING FAN NOZZLE NACELLE

(75) Inventor: Mark E. Howe, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 592 days.

(21) Appl. No.: 12/323,951

(22) Filed: Nov. 26, 2008

(65) Prior Publication Data

US 2010/0126139 A1 May 27, 2010

(51) Int. Cl.
*F02K 3/02* (2006.01)
(52) U.S. Cl. .................................. 60/226.3; 60/230
(58) Field of Classification Search ............... 60/226.1, 60/226.3, 262, 230, 770, 771; 244/110 B; 239/265.19, 265.27, 265.31, 265.33
See application file for complete search history.

(56) References Cited

U.S. PATENT DOCUMENTS 3,279,182 A * 10/1966 Helmintoller ............... 60/226.2
(Continued)

FOREIGN PATENT DOCUMENTS

EP 1 852 346 A1 7/2007

*Primary Examiner* — Louis Casaregola
*Assistant Examiner* — Phutthiwat Wongwian

(57) ABSTRACT

A variable area nozzle system for a gas turbine engine includes a fan duct inner wall, a fan duct outer wall disposed in radially spaced relation to the fan duct inner wall, and a fan nozzle. The fan nozzle defines at least a portion of the fan duct outer wall and includes a nozzle aft edge. The fan duct inner wall and the nozzle aft edge collectively define a fan duct nozzle throat area. The fan nozzle is configured to pivot about a pivot axis that may be oriented transversely relative to a longitudinal axis of the gas turbine engine. The fan nozzle may be pivoted from a stowed position to a deployed position in order to vary the fan duct nozzle throat area.

16 Claims, 8 Drawing Sheets

U.S. PATENT DOCUMENTS

| | | | |
|---|---|---|---|
| 3,779,010 A * | 12/1973 | Chamay et al. | 60/226.2 |
| 3,797,785 A | 3/1974 | Baerresen et al. | |
| 3,814,325 A | 6/1974 | McCardle, Jr. et al. | |
| 3,829,020 A | 8/1974 | Stearns | |
| 3,863,867 A * | 2/1975 | Souslin et al. | 244/12.5 |
| 3,936,226 A * | 2/1976 | Harner et al. | 416/28 |
| 4,026,105 A | 5/1977 | James | |
| 4,030,290 A | 6/1977 | Stachowiak | |
| 4,030,291 A | 6/1977 | Sargisson | |
| 4,030,687 A | 6/1977 | Hapke | |
| 4,068,469 A * | 1/1978 | Adamson | 60/204 |
| 4,093,122 A * | 6/1978 | Linderman et al. | 239/127.3 |
| 4,132,068 A * | 1/1979 | Johnston | 60/226.2 |
| 4,155,221 A | 5/1979 | Dhoore et al. | |
| 4,183,478 A | 1/1980 | Rudolph | |
| 4,196,856 A | 4/1980 | James | |
| 4,216,923 A | 8/1980 | Harris | |
| 4,278,220 A | 7/1981 | Johnston et al. | |
| 4,327,548 A * | 5/1982 | Woodward | 60/226.2 |
| 4,375,276 A | 3/1983 | Konarski | |
| 4,437,627 A | 3/1984 | Moorehead | |
| 4,458,863 A | 7/1984 | Smith | |
| 4,463,902 A | 8/1984 | Nightingale | |
| 4,463,903 A | 8/1984 | Nightingale | |
| 4,501,393 A | 2/1985 | Klees et al. | |
| 4,502,637 A | 3/1985 | Nightingale | |
| 4,502,638 A | 3/1985 | Szuminski et al. | |
| 4,529,130 A | 7/1985 | Szuminski et al. | |
| 4,564,160 A | 1/1986 | Vermilye | |
| 4,592,508 A | 6/1986 | Thornock | |
| 4,690,329 A | 9/1987 | Madden | |
| 4,697,763 A | 10/1987 | Vermilye | |
| 4,753,392 A | 6/1988 | Thayer et al. | |
| 4,802,629 A | 2/1989 | Klees | |
| 4,852,805 A | 8/1989 | Vermilye | |
| 4,865,256 A * | 9/1989 | Durand et al. | 239/265.29 |
| 4,909,442 A | 3/1990 | Fernz | |
| 4,922,711 A | 5/1990 | Brown | |
| 4,966,327 A | 10/1990 | Fage et al. | |
| 4,978,071 A | 12/1990 | MacLean et al. | |
| 5,092,525 A | 3/1992 | Roach et al. | |
| 5,097,661 A | 3/1992 | Lair et al. | |
| 5,097,662 A | 3/1992 | Vieth | |
| 5,103,634 A | 4/1992 | Harrison et al. | |
| 5,142,862 A | 9/1992 | Brown | |
| 5,156,360 A | 10/1992 | Shine | |
| 5,181,676 A | 1/1993 | Lair | |
| 5,192,023 A | 3/1993 | Fage et al. | |
| 5,203,164 A | 4/1993 | Paulson | |
| 5,216,878 A | 6/1993 | Klees | |
| 5,222,359 A | 6/1993 | Klees et al. | |
| 5,310,117 A | 5/1994 | Fage et al. | |
| 5,343,696 A | 9/1994 | Rohra et al. | |
| 5,437,412 A | 8/1995 | Carletti | |
| 5,448,884 A | 9/1995 | Repp | |
| 5,463,866 A | 11/1995 | Klees | |
| 5,507,143 A | 4/1996 | Luttgeharm et al. | |
| 5,609,020 A | 3/1997 | Jackson et al. | |
| 5,655,360 A | 8/1997 | Butler | |
| 5,706,649 A | 1/1998 | Robinson et al. | |
| 5,725,182 A * | 3/1998 | Valleroy | 244/110 B |
| 5,730,392 A | 3/1998 | Lair | |
| 5,778,659 A | 7/1998 | Duesler et al. | |
| 5,794,434 A | 8/1998 | Szupkay | |
| 5,806,302 A | 9/1998 | Cariola et al. | |
| 5,826,794 A | 10/1998 | Rudolph | |
| 5,833,140 A * | 11/1998 | Loffredo et al. | 239/265.37 |
| 5,908,159 A | 6/1999 | Rudolph | |
| 5,974,783 A | 11/1999 | Gonidec et al. | |
| 5,987,880 A | 11/1999 | Culbertson | |
| 6,286,784 B1 | 9/2001 | Hardy et al. | |
| 6,289,670 B1 | 9/2001 | Charier et al. | |
| 6,308,898 B1 | 10/2001 | Dorris, III et al. | |
| 6,688,099 B2 | 2/2004 | Lair | |
| 6,751,944 B2 | 6/2004 | Lair | |
| 6,764,045 B2 | 7/2004 | Sternberger | |
| 6,813,877 B2 * | 11/2004 | Birch et al. | 60/226.1 |
| 6,824,101 B2 | 11/2004 | Sternberger et al. | |
| 6,915,984 B2 | 7/2005 | Sternberger et al. | |
| 6,938,408 B2 * | 9/2005 | Lair | 60/226.2 |
| 7,124,981 B2 | 10/2006 | Parham | |
| 7,127,880 B2 | 10/2006 | Lair et al. | |
| 7,950,237 B2 * | 5/2011 | Grabowski et al. | 60/771 |
| 2003/0221411 A1 * | 12/2003 | Nesbitt et al. | 60/204 |
| 2008/0073460 A1 | 3/2008 | Beardsley et al. | |
| 2008/0075580 A1 | 3/2008 | Yanaji et al. | |

\* cited by examiner

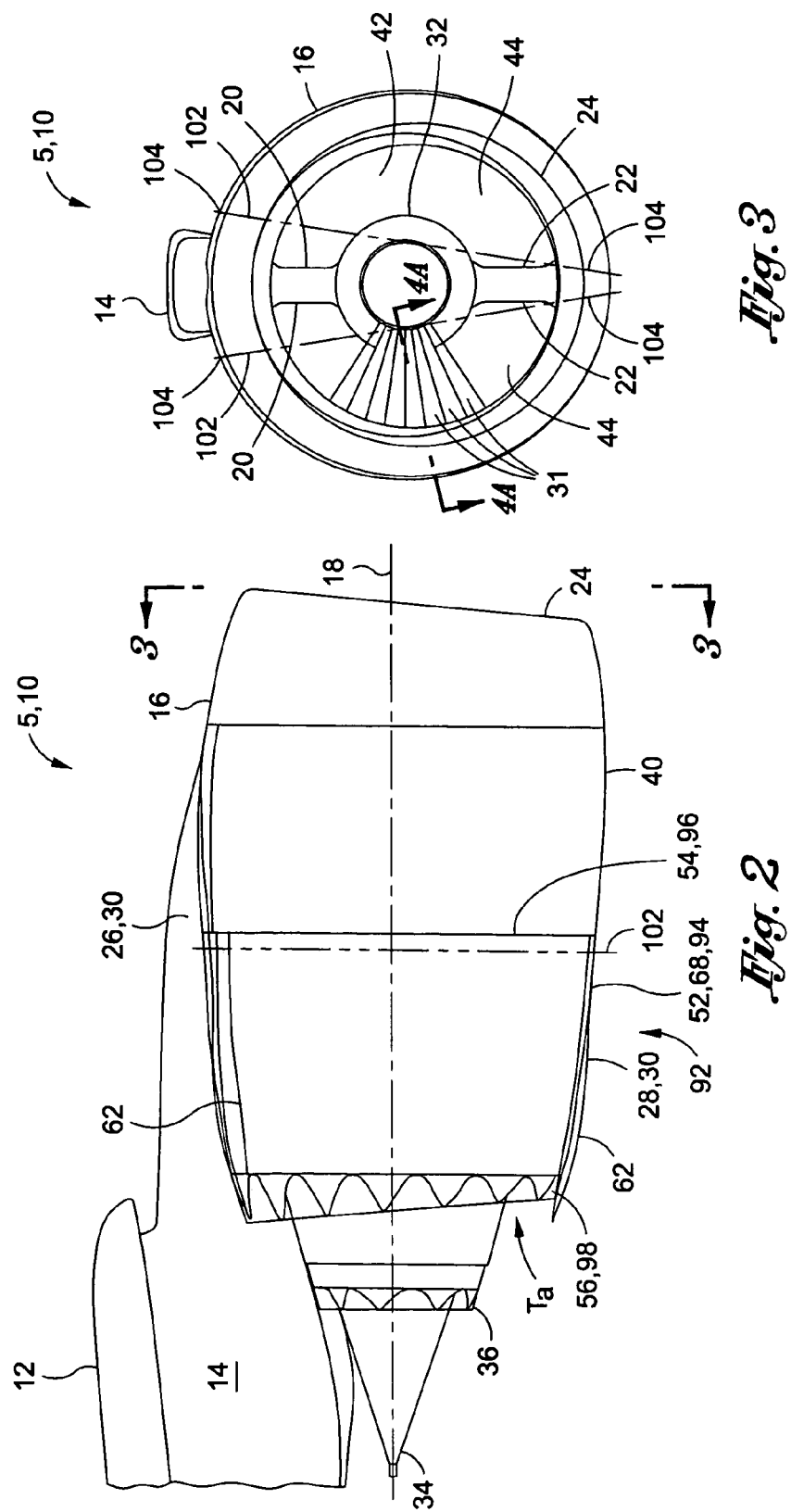

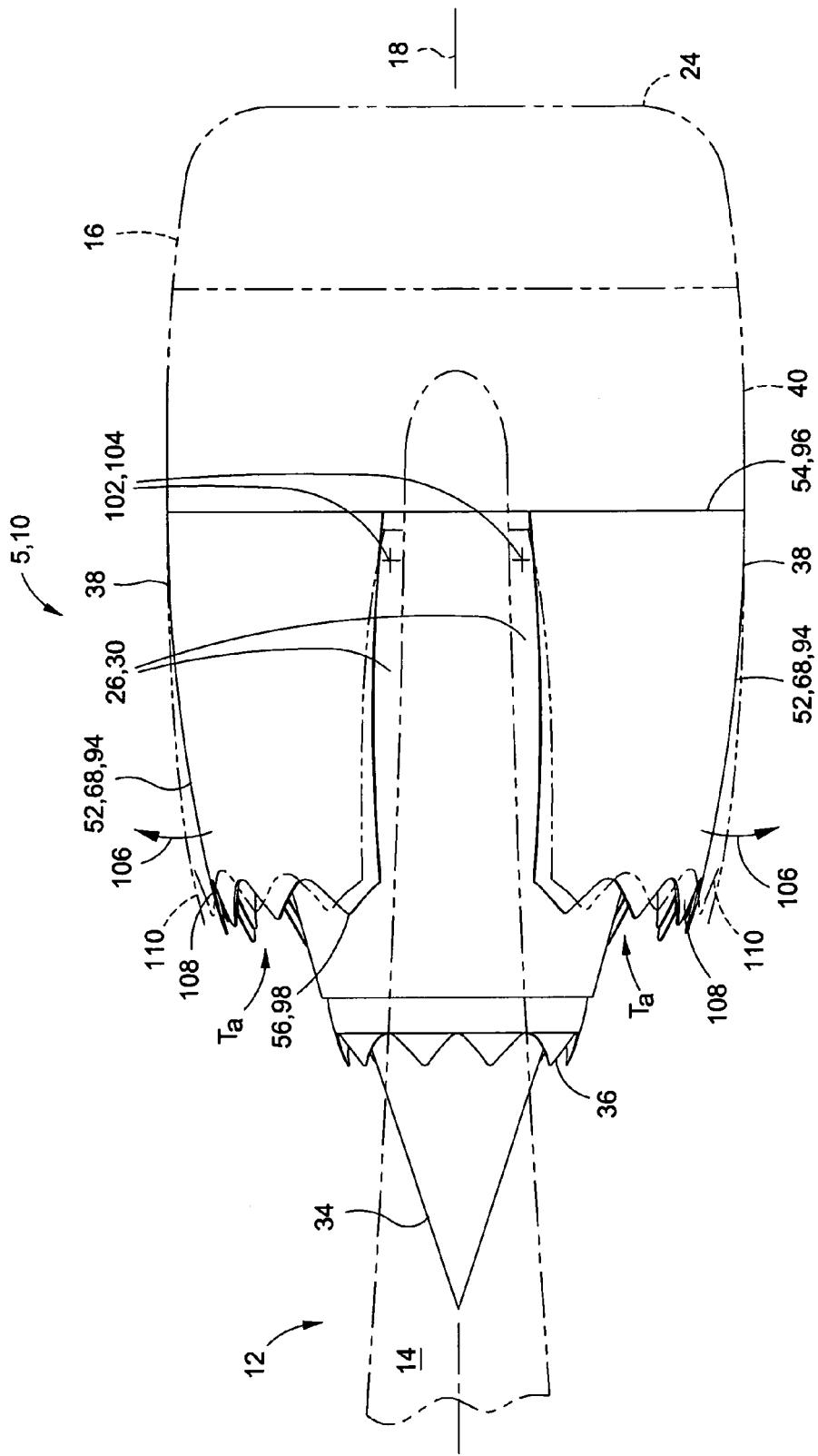

PIVOTING FAN NOZZLE NACELLE

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to gas turbine engines and, more particularly, to an engine nacelle having a variable area fan nozzle.

BACKGROUND

Aircraft noise pollution is a significant environmental problem for communities near airports. Jet engine exhaust accounts for a majority of the noise produced by engine-powered aircraft during takeoff. Because it occurs at a relatively low frequency, jet engine exhaust noise is unfortunately not effectively damped by the atmosphere alone. The prior art includes several attempts at reducing jet engine exhaust noise. Such attempts are directed at altering the flow characteristics of the engine exhaust which can be comprised of several components.

Bypass turbofan engines typically produce two exhaust stream components. A first component stream is referred to as the primary exhaust flow and is discharged from a core exhaust nozzle after passing through a core engine. A second component stream passes through an annular fan duct which surrounds the core engine. The second component stream, referred to as the fan exhaust flow, exits a fan nozzle collectively defined by an aft edge of the fan nozzle and the fan duct inner wall which surrounds the core engine. The fan exhaust stream and the primary exhaust stream collectively form the thrust that is generated by the engine.

In bypass turbofan engines, the primary exhaust flow throat area at the exhaust nozzle and the fan exhaust flow throat area at the fan nozzle are preferably optimized for specific engine operating condition. For example, during takeoff, a relatively high level of thrust is required of the engines as compared to lower levels of thrust that are required during cruise flight. Increasing the quantity or mass of airflow through the fan duct having a fixed throat area at the fan nozzle results in an increase in the velocity of the airflow. An increase in the nozzle exit velocity results in an increase in the amount of noise that is generated by the nozzle.

For example, if the fan duct nozzle throat area is configured for duct mass airflow at cruise conditions, then the increased mass of airflow associated with higher thrust levels will result in a higher velocity of the airflow through the fan nozzle. Nozzle exit velocities that are higher than the optimal velocity for a given nozzle exit area result in a generally higher level of exhaust noise. Noise generated by the fan nozzle exhaust may be reduced by decreasing the velocity of airflow through the fan nozzle. Increasing the fan nozzle exit or throat area results in a reduction in the velocity of the exhaust as it exits the fan duct and therefore reduces the level of noise.

Included in the prior art are several approaches to increasing the fan nozzle exit area (i.e., throat area) such as during takeoff in order to reduce exhaust noise. One approach includes linearly translating the fan nozzle in an aft direction parallel to a longitudinal axis of the engine in order to increase the fan nozzle exit area and thereby reduce the velocity of the exhaust. Although effective in reducing exhaust noise, the aft-translating approach presents several deficiencies which detract from its overall utility. For example, in some prior art engines, the aft-translating approach results in the creation of a slot or opening which allows air to exhaust through the cowl wall. Unfortunately, the opening in the cowl wall adds additional cross-sectional area rather than enlarging the exhaust nozzle throat.

Furthermore, the creation of the opening results in leakage through the engine nacelle with an associated loss of engine thrust. Additionally, the aft-translating approach requires the use of swiping seals which present a maintenance risk. An additional drawback associated with the aft-translating approach is that an overlap is created between the duct wall and the fan nozzle resulting in a reduction in the surface area of acoustic treatment in the fan duct. Such acoustic treatment may include sound-absorbing material such as honeycomb placed along the fan duct inner wall to absorb some of the exhaust noise.

Even further, the aft-translating sleeve must be capable of moving a relatively large distance between stowed and deployed positions in order to provide optimum noise-reduction/engine thrust capability at takeoff in the deployed position and optimal engine efficiency at cruise in the stowed position. For wing-mounted engines, the presence of moveable wing devices such as leading edge Krueger flaps or slats and trailing edge control surfaces such as wing flaps may present clearance problems between the translating sleeve and the control surface considering the amount of travel of the translating sleeve.

Another approach to increasing the fan nozzle exit area as a means to reduce noise generated during high thrust events such as during takeoff is through the use of expanding flaps or petals which form the nozzle exit external surface. More typically applied to primary exhaust nozzles of military aircraft, the flaps or petals may be pivoted outwardly to enlarge the throat area of the nozzle and thereby reduce the exhaust velocity. The flaps or petals may also be biased to one side or the other in order to provide thrust vectoring for increased maneuverability of the aircraft. As may be appreciated, the implementation of a flap or petal scheme for changing nozzle exit area is structurally and functionally complex and presents weight, maintenance and cost issues.

An additional consideration in a variable area fan nozzle for reducing exhaust noise is that a movable fan nozzle must be compatible with thrust reversers commonly employed on modern jet engines. As is known in the art, thrust reversers on jet engines may reduce landing distance of an aircraft in normal (e.g., dry) runway conditions or increase safety in slowing the aircraft in slick (e.g., wet) runway conditions. Thrust reversers operate by reorienting the normally aftwardly directed flow of exhaust gasses into a forward direction in order to provide braking thrust to the aircraft. The reorienting of the engine exhaust gasses is facilitated by spoiling, deflecting and/or turning the flow stream of the primary exhaust and/or the fan exhaust.

For turbofan engines, thrust reversers may include the use of cascades, pivoting doors or by reversing the pitch of the fan blades. In cascade-type thrust reverser, the turbofan engine may include an outer translating sleeve which is configured to move axially aft to uncover deflecting vanes mounted in the nacelle cowl. Simultaneous with the aft movement of the translating sleeve, blocker doors in the fan duct are closed in order to redirect the fan flow outwardly through the deflecting vanes and into a forward direction to provide thrust-reversing force. Due to the widespread implementation of thrust reversal capability on many aircraft, a variable area fan nozzle must be compatible with thrust reverser systems commonly employed on modern jet engines As can be seen, there exists a need in the art for a variable area fan nozzle which is effective in increasing the nozzle exit area of a gas turbine engine in order to reduce noise at takeoff by reducing exhaust velocity. In addition, there exists a need in the art for a variable area fan nozzle which can achieve an increase in nozzle area but which requires a minimal amount of travel to avoid interfering with various components such as trailing edge control surfaces. Also, there exists a need in the art for a variable area fan nozzle which is compatible with thrust reversers commonly employed on gas turbine engines. Finally, there exists a need in the art for a variable area fan nozzle which is simple in construction, low in cost and requiring minimal maintenance.

BRIEF SUMMARY

The above-noted needs associated with fan nozzles of the prior art are specifically addressed and alleviated by the present disclosure which provides a variable area nozzle system for a gas turbine engine. The nozzle system includes a pair of semi-cylindrical fan nozzles mounted on opposite sides of the gas turbine engine. The fan nozzles are configured to pivot outwardly in order to vary the fan duct nozzle throat area of the gas turbine engine.

Although the nozzle system may include a pair of the fan nozzles mounted on opposite sides of the gas turbine engine, the nozzle system is described below in the context of one of the fan nozzles wherein the fan nozzle may be pivoted from a stowed position to a deployed position, and vice versa, about a pivot axis. In one embodiment, the pivot axis may be oriented transversely relative to a longitudinal axis (i.e., engine centerline) of the gas turbine engine. The nozzle system facilitates pivoting of the fan nozzle between stowed and deployed positions. However, in a further embodiment, the fan nozzle may be selectively pivotable to at least one of a plurality of predetermined positions between the stowed and deployed positions.

In this regard, the nozzle system as disclosed herein provides an ability to tailor the fan duct nozzle throat area to a variety of different engine operating conditions and/or to a variety of different flight conditions. For example, the nozzle system may facilitate outward pivoting of the fan nozzle to provide a larger fan duct nozzle throat area for high thrust power settings and/or for reduced exhaust noise as may be desirable during takeoff. Conversely, the fan nozzle may be pivoted inwardly to the stowed position in order to provide a relatively smaller fan duct nozzle throat area as may be desirable for lower cruise thrust power settings. In this regard, the nozzle system provides a mechanism for achieving a desired fan duct nozzle throat area by pivoting the fan nozzle to a desired position that provides an optimal fan duct nozzle throat area.

The technical effects of the disclosed embodiments allow for selective positioning of the fan nozzle in order to achieve a variety of different fan duct nozzle throat areas for a high bypass turbofan gas turbine engine. The disclosed embodiments may be implemented on a variety of alternative gas turbine engine configurations and are not limited solely to high bypass turbofan engines. In addition, the nozzle system as disclosed herein results in a relatively large increase in fan duct nozzle throat area for the amount of movement required of the fan nozzle as compared to prior art fan nozzle configurations which are purely axially translating.

In this regard, the outwardly pivoting fan nozzle as disclosed herein may provide two (2) to three (3) times the increase in fan duct nozzle throat area as compared to purely axially-translating fan nozzles. Even further, the nozzle system as disclosed herein facilitates an increase in fan duct nozzle throat area which may be unachievable by purely aft-translating fan nozzles due to clearance problems with structure mounted behind the engine such as control surfaces (e.g., flaps) mounted on a trailing edge of a wing.

The nozzle system as disclosed herein may be configured to allow for pivoting motion of the fan nozzle to the deployed position wherein the throat area of the fan nozzle is at a maximum (e.g., to the deployed position) as may be desirable for high thrust settings of the engine during takeoff but where noise suppression is also desired. Likewise, the nozzle system may facilitate pivoting of the fan nozzle to an optimal position (e.g., to the stowed position) for lower engine thrust settings such as during cruise flight where noise suppression is not required but where nozzle efficiency dictates a reduced fan duct nozzle throat area.

The nozzle system preferably facilitates axially aft movement of the fan nozzle as may be required for thrust reversal actuation purposes. In this regard, the fan nozzle, in one embodiment, may be pivotable between the stowed and deployed positions when the translating sleeve (i.e., fan nozzle) is moved axially aft during thrust reverser actuation or when the translating sleeve is moved axially forward during thrust reverser retraction. Even further, the translating sleeve is configured to be axially translatable in forward or aft directions regardless of whether the fan nozzle is in the deployed or retracted position or in an intermediate position. The fan nozzle may be configured such that axially aft movement thereof may occur non-contemporaneously with inward or outward pivoting of the fan nozzle.

The fan nozzle may be configured to pivot about a pivot axis which, in one embodiment, may be positioned adjacent a nozzle forward edge of the fan nozzle. For gas turbine engines having a translating sleeve-type thrust reverser, the term "fan nozzle" as used herein may be synonymous with the term "translating sleeve" and the terms "nozzle forward edge" and "nozzle aft edge" may be synonymous with the terms "sleeve forward edge" and "sleeve aft edge," respectively.

An opposing pair of the fan nozzles may be provided on left-hand and right-hand sides of the gas turbine engine which may comprise bifurcated fan duct segments. Each one of the bifurcated fan duct segments may be collectively defined by the respective fan nozzle and the corresponding fan duct inner wall. By outward pivoting of each fan nozzle relative to the fan duct inner wall of the bifurcated fan duct segment, the fan duct nozzle throat area may be varied. In this regard, for bifurcated gas turbine engines, each of the fan nozzles may be configured to be pivoted about its own unique pivot axis which may be non-coaxial or non-aligned with the pivot axis of the fan nozzle on the opposite side of the gas turbine engine.

The nozzle system may be configured to be implemented on gas turbine engines having thrust reversal capability such as gas turbine engines having translating sleeve or cascade-type thrust reversers as well as on other thrust reverser configurations including, without limitation, pivoting door-type thrust reversers and reversible fan blade-type thrust reversers. In addition, it is contemplated that the nozzle system as disclosed herein may be implemented on alternative gas turbine engine configurations and is not limited solely to bypass turbofan engines.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present invention will become more apparent upon reference to the drawings wherein like numbers refer to like parts throughout and wherein:

FIG. 2 is a side illustration of the gas turbine engine propulsion system comprising a gas turbine engine housed in a nacelle and including a fan nozzle and a primary exhaust nozzle disposed aftwardly of the fan nozzle;

FIG. 3 is a front illustration of the nacelle taken along lines 3-3 of FIG. 2 and illustrating a pair of pivot axes about which an opposing pair of fan nozzles may be pivoted outwardly in order to vary a fan duct nozzle throat area of the nacelle;

FIG. 5 is a top illustration of the nacelle illustrating the relative positions of the fan nozzles in the stowed and deployed positions;

DETAILED DESCRIPTION

Figure 1:
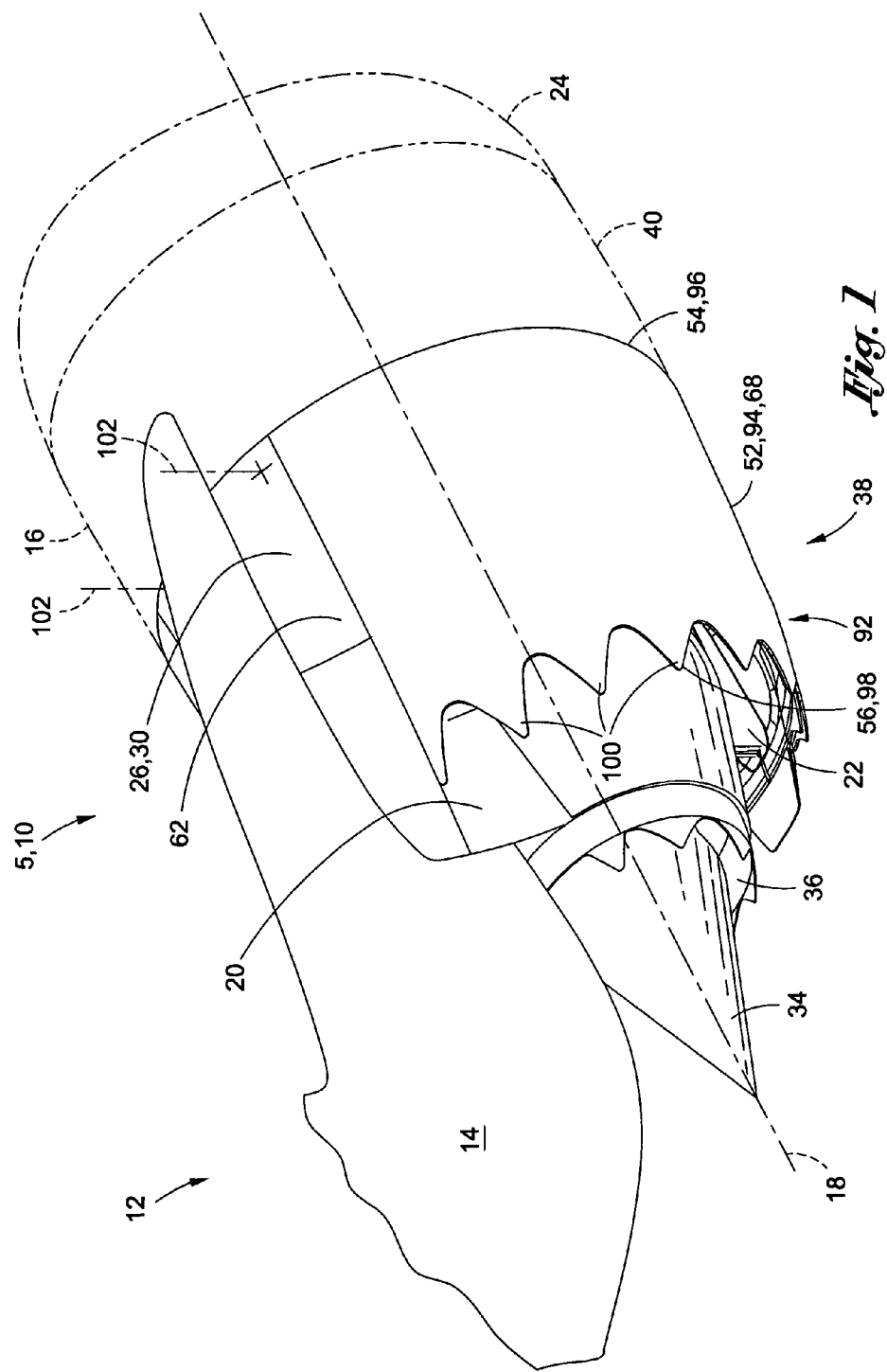
FIG. 1 is a perspective illustration of a turbofan gas turbine engine propulsion system as may be mounted on a strut or a pylon of an aircraft.

Referring now to the drawings wherein the showings are for purposes of illustrating preferred and various embodiments of the disclosure only and not for purposes of limiting the same, shown in FIG. 1 is a high bypass turbofan gas turbine engine propulsion system 10 comprising a gas turbine engine 5 housed in a nacelle 16 incorporating a variable area nozzle system 92 as disclosed herein. In a broad sense, the nozzle system 92 may include a pair of fan nozzles 94 mounted on opposing sides of the gas turbine engine 5. Although the nozzle system 92 preferably includes a pair of the fan nozzles 94 as illustrated in the Figures, the disclosed embodiments are described below in the context of a single one of the fan nozzles 94 wherein the described features are applicable to each one of the fan nozzles 94 of the pair. In this regard, the fan nozzle 94 is configured to pivot about a pivot axis 102. The pivot axis 102 is preferably oriented transversely relative to a longitudinal axis 18 (i.e., engine centerline) of the nacelle 16. The fan nozzle 94 is configured to pivot about the pivot axis 102 between stowed and deployed positions 108, 110 in order to vary the fan duct nozzle throat area Ta.

The nacelle 16 has a fan duct inner wall 46 and a fan duct outer wall 48 which is disposed in radially spaced relation to the fan duct inner wall 46. The fan nozzle 94 defines at least a portion of the fan duct outer wall 48. The fan nozzle 94 also includes a nozzle aft edge 98 which may include chevrons 100. The nozzle aft edge 98 and the fan duct inner wall 46 collectively define the fan duct nozzle throat area Ta that may be increased by pivoting the fan nozzle 94 in an outward direction. More specifically, by pivoting the fan nozzle 94 outwardly, the nozzle aft edge 98 is pivoted away from the fan duct inner wall 46 which increases the fan duct nozzle throat area Ta. By increasing the fan duct nozzle throat area Ta, the velocity of the fan flow 50 passing through the fan duct 42 decreases and therefore reduces the level of exhaust noise.

Although the present disclosure is described in the context of a high bypass gas turbine engine propulsion system 10 as illustrated in the Figures, the nozzle system 92 may be implemented on other various types of gas turbine engines where it is desirable to increase the fan duct nozzle throat area Ta to an optimal size for a given engine operating condition and/or to reduce exhaust noise. For example, the nozzle system 92 may be configured to allow for pivoting of the fan nozzle 94 to the deployed position 110. In the deployed position 110, the fan duct nozzle throat area $Ta_T$ of the fan nozzle 94 is at a maximum which may be desirable for high thrust settings of the engine 5 such as during takeoff and climb-out but where noise suppression may also be desired. Likewise, the fan nozzle 94 may be pivoted back to the stowed position 108 wherein the fan duct nozzle throat area $Ta_C$ is reduced for lower engine thrust settings such as for cruise flight.

Referring to FIGS. 1-5, shown is the gas turbine engine propulsion system 10 which may be supported by a pylon or strut 14 which, in turn, may be mounted to an aircraft 12 such as to a wing. As is known in the art, the turbofan gas turbine engine 5 may include a core engine 32 within which pressurized air may be mixed with fuel for generating combustion gases. The combustion gases in the core engine 32 flow through turbine stages and are expelled at a primary exhaust nozzle 36. As can be seen in FIG. 1, the primary exhaust nozzle 36 may be defined by a generally conically-shaped primary exhaust plug 34 located at an aft end of the fan duct inner wall 46.

The turbofan gas turbine engine propulsion system 10 includes the fan duct 42 which is bounded by the fan duct inner wall 46 and the fan duct outer wall 48. The fan flow 50 passes through the fan duct 42 under the influence of air that is pressurized by a fan 31 located at a forward end of the turbofan gas turbine engine 5 near an inlet 24. Airflow that passes through the fan 31 is divided into a flow that passes through a core engine 32 and a flow that passes through the fan duct 42. A large portion of the propulsive thrust that is generated by the turbofan gas turbine engine propulsion system 10 is a result of the pressurized air flow passing through the fan duct 42 and exiting the fan nozzle 94.

As can be seen in FIGS. 1-3 and 5, the gas turbine engine propulsion system 10 includes an engine nacelle 16 having the inlet 24 at the forwardmost end of the engine 5. Located aft of the inlet 24 is a stationary fan cowl 40 which houses the rotating fan 31 blades. The stationary fan cowl 40 forms part of a cowl assembly 38 which preferably defines at least a portion of an outer aerodynamic cowl of the fan duct outer wall 48. The cowl assembly 38 may further include a translating sleeve 52 for nacelles having a thrust reverser 68. As shown in FIGS. 1-3 and 5, the translating sleeve 52 may include sleeve forward and sleeve aft edges 54, 56.

Figure 4A:
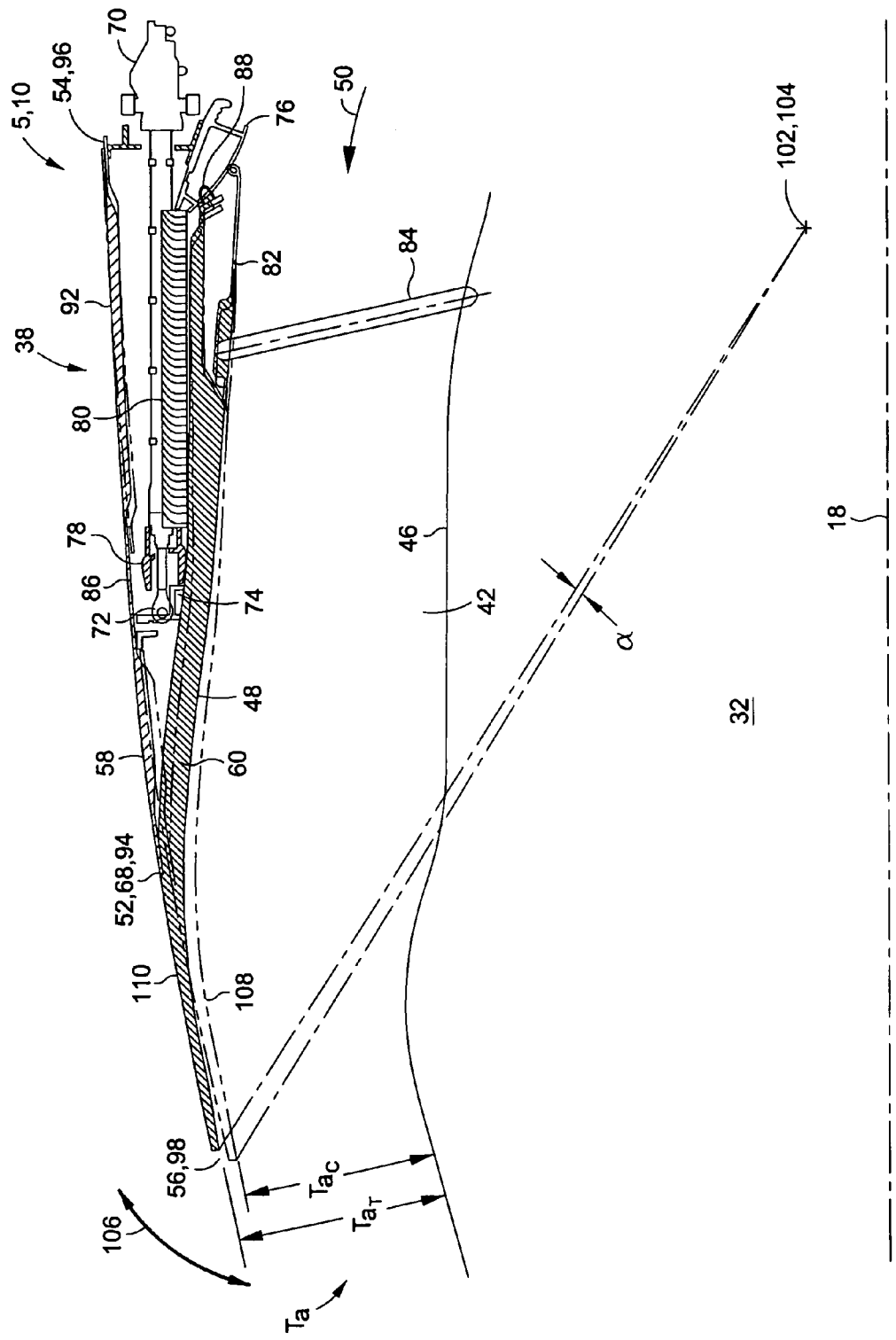
FIG. 4A is a sectional illustration of the nacelle taken along lines 4-4 of FIG. 3 and illustrating the fan nozzle in a stowed position and superimposed over the fan nozzle in a deployed position.
Figure 4B:
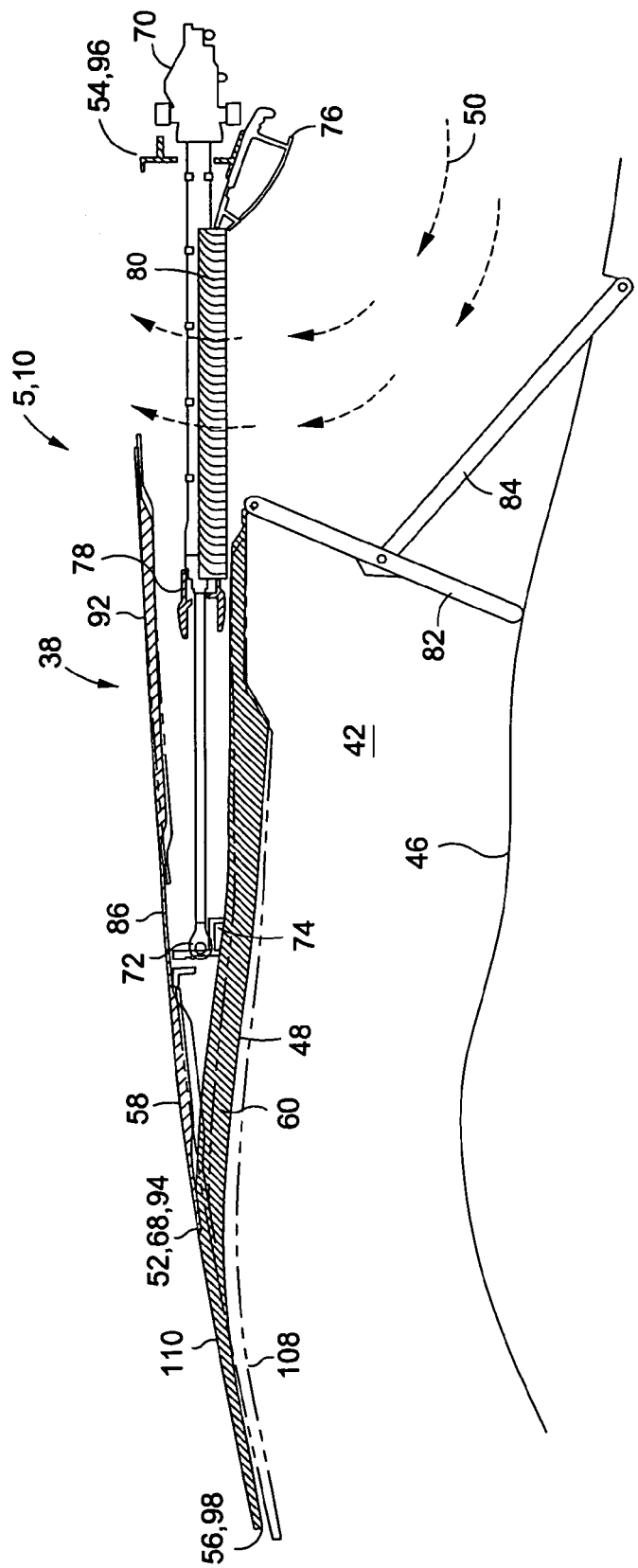
FIG. 4B is a sectional illustration of the fan nozzle moved axially aftwardly in a thrust reverser open position.

Referring briefly to FIGS. 4A and 4B, in an embodiment known in the art, the translating sleeve 52 is configured to move axially aftwardly in order to redirect the fan flow 50 through one or more cascade segments 80 which may comprise a plurality of deflecting vanes circumferentially arranged about the fan duct 42. As shown in FIG. 4B, the fan flow 50 is reoriented into a forward direction when the cascade segments 80 are uncovered by the axially translating sleeve 52 while blocker doors 82 simultaneously close off the fan duct 42. The translating sleeve 52 may be actuated by one or more thrust reverser actuators 70. In one embodiment, the gas turbine engine propulsion system 10 may include angularly-spaced upper, center and lower thrust reverser actuators 70 on each of left and right engine halves.

Referring to FIG. 3, the fan duct 42 may comprise a bifurcated arrangement including a pair of bifurcated fan duct segments 44 as an alternative to a continuous or unobstructed annular geometry. As can be seen, the bifurcated fan duct segments 44 may comprise two generally semi-cylindrical annular cavities which may be joined at an upper bifurcation 20 along a hinge beam 26 and at a lower bifurcation 22 along a latch beam 28 of the nacelle 16. In the arrangement shown, the semi-cylindrical fan cowl 40 and the fan nozzle 94 (i.e., translating sleeve 52) on each side of the engine propulsion system 10 may be unlatched at the latch beam 28 on the lower end of the nacelle 16 and then pivoted upwardly in order to expose the core engine 32 for maintenance purposes. Mounted to each one of the latch beam 28 and hinge beam 26 may be a slider mechanism 62 to facilitate axially sliding motion of the semi-cylindrical translating sleeve 52 (i.e., fan nozzle 94) to uncover the cascade segments 80 during thrust reverser 68 actuation.

As best seen in FIGS. 3 and 5, the fan nozzles 94 on each side of the engine propulsion system 10 may be configured to pivot about a respective pivot axis 102 in order to vary the fan duct nozzle throat area Ta. The pivot axes 102 are shown as being distinct from one another. However, it is contemplated that the fan nozzles 94 on each side of the engine propulsion system 10 may pivot about a common pivot axis 102 or the pivot axes 102 may be oriented in parallel and/or symmetrical but spaced relation to one another. Regardless of the orientation and locations of the pivot axes 102, the fan nozzles 94 may be mounted in any suitable manner that facilitates outward pivotal movement.

Referring to FIG. 4A, shown is the thrust reverser 68 in an embodiment known in the art. The thrust reverser 68 (i.e., translating sleeve 52/fan nozzle 94) in FIG. 4A is shown in a closed position such that the cascade segments 80 are covered by the translating sleeve 52. The thrust reverser actuator 70 in FIG. 4A is shown as being fixedly mounted adjacent a bull nose 76/torque box of the fan cowl 40. The thrust reverser actuator 70 may be coupled at its opposite end to an actuator bracket 74 via a rod end 72 of the thrust reverser actuator 70. The actuator bracket 74 may be mounted to the translating sleeve 52 (i.e., fan nozzle 94) which may comprise a cowl outer panel 58 and a cowl inner panel 60 arranged in spaced relation to one another such that the cascade segments 80 are nested there between when the thrust reverser 68 (i.e., translating sleeve 52/fan nozzle 94) is in the closed position as shown in FIG. 4A. An access door 86 may be disposed adjacent the rod end 72/actuator bracket 74 to facilitate inspection and maintenance of the rod end 72/actuator bracket 74. The thrust reverser 68 may include a thrust reverser stow lock 90 to prevent uncommanded activation of the translating sleeve 52.

Referring to FIG. 4B, upon activation of the thrust reverser 68, the translating sleeve 52 may be moved axially aftwardly into an open position via the extended rod end 72 of the thrust reverser actuator 70. During thrust reversal, one or more blocker doors 82 may be pivoted inwardly across the fan duct 42 into contact with the fan duct inner wall 46 as a result of a drag link 84 pivotally connecting the blocker door 82 to the fan duct inner wall 46. In the deployed position, the blocker doors 82 prevent the passage of fan flow 50 toward the aft end of the fan duct 42 and instead cause the fan flow 50 to be redirected outwardly through the exposed cascade segments 80 for thrust reversal.

In an embodiment known in the art, the cascade segments 80 may be supported at an aft end by a cascade support ring 78 and at a forward end by the bull nose 76 and torque box. The semi-cylindrical fan nozzle 94 may be supported at upper and lower sides (i.e., along the upper and lower bifurcations 20, 22 of the gas turbine engine) by a slider mechanism 62 which facilitates axially sliding motion of the fan nozzle 94. In this regard, each one of the upper and lower sides of the fan nozzle 94 may be connected to the hinge beam 26 and latch beam 28 via the slider mechanism 62 at each location.

Referring particularly to FIGS. 6, 6A, 6B, 7 and 7A, shown is the fan nozzle 94 on one side of the nacelle 16 and illustrating the pivoting attachment thereof to the hinge beam 26 or pivot beam 30. As was mentioned, the hinge beam 26/pivot beam 30 is preferably located on an upper portion of the bifurcated gas turbine engine propulsion system 10 and the latch beam 28/pivot beam 30 is preferably located on a lower portion thereof. It should be noted that the illustration of the slider mechanism 62 and the hinge beam 26/pivot beam 30 is exemplary only and represents a preferred configuration of the attachment of the fan nozzle 94 to the hinge beam 26. Other arrangements are contemplated wherein the hinge and latch beams 26, 28 may be omitted from the gas turbine engine propulsion system 10 such that upward pivoting of the fan nozzle 94 and fan cowl 40 on each side of the engine propulsion system 10 is not accommodated but wherein pivoting of the fan nozzle 94 is facilitated.

Figure 6:
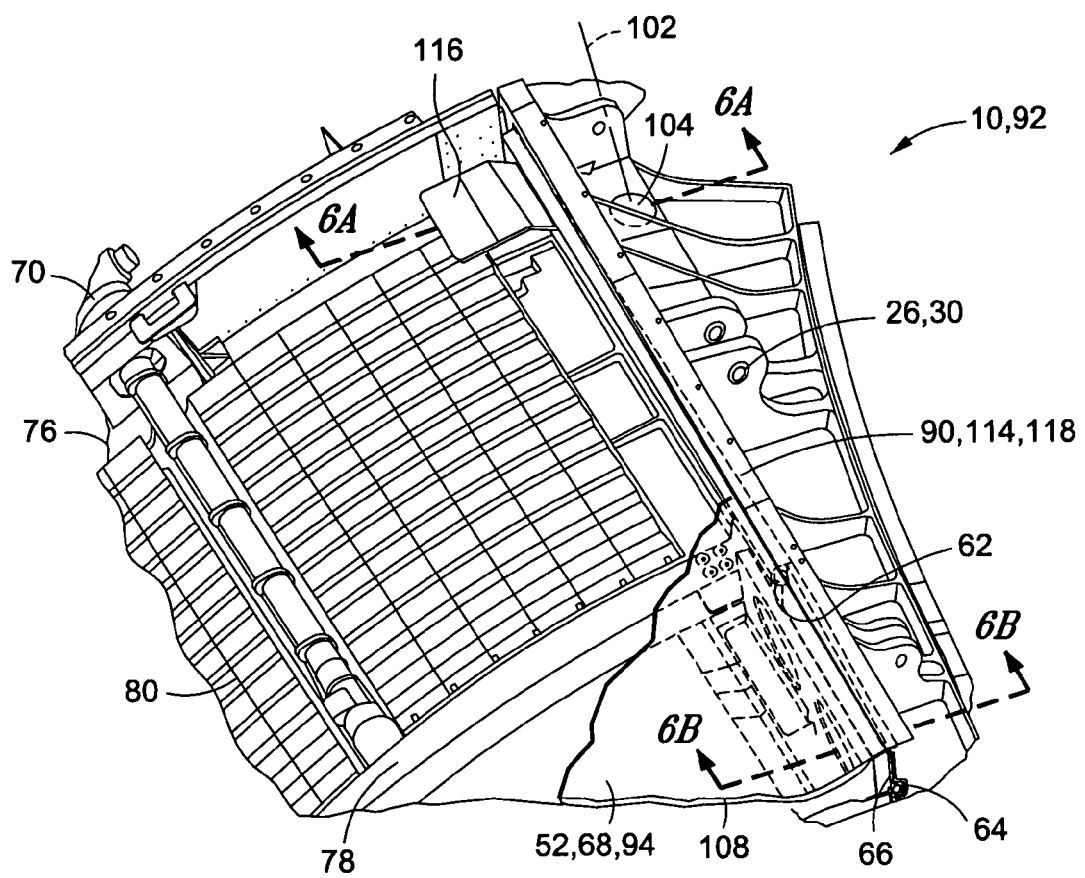
FIG. 6 is a partially cutaway top-down illustration of the fan nozzle in the stowed position.
Figure 7:
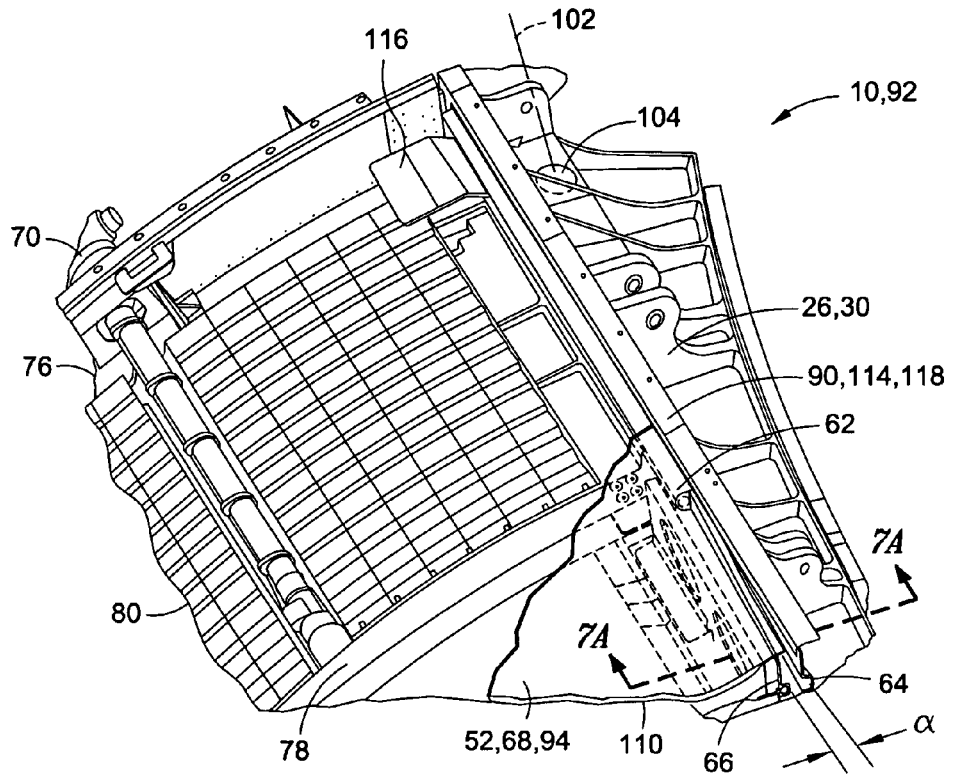
FIG. 7 is a partially cutaway top-down illustration of the fan nozzle in the deployed position showing the fan nozzle pivoted away from the hinge beam.

As shown in FIGS. 6 and 7, the nozzle system 92 may include a pivot pin 104 to pivotally connect the fan nozzle 94 to the hinge beam 26/pivot beam 30. More specifically, the fan nozzle 94 may be mounted to a slider mechanism 62 that is pivotally coupled to the pivot beam 30. As can be seen, the slider mechanism 62 may be comprised of at least one track beam 64 operatively coupled to a slider beam 66 to allow for axially sliding motion of the fan nozzle 94 as may be required for thrust reversal. In the embodiment shown, the slider mechanism 62 comprises a pair of tongue and groove arrangements integrally formed with the track beam 64 and slider beam 66.

Figure 6A:
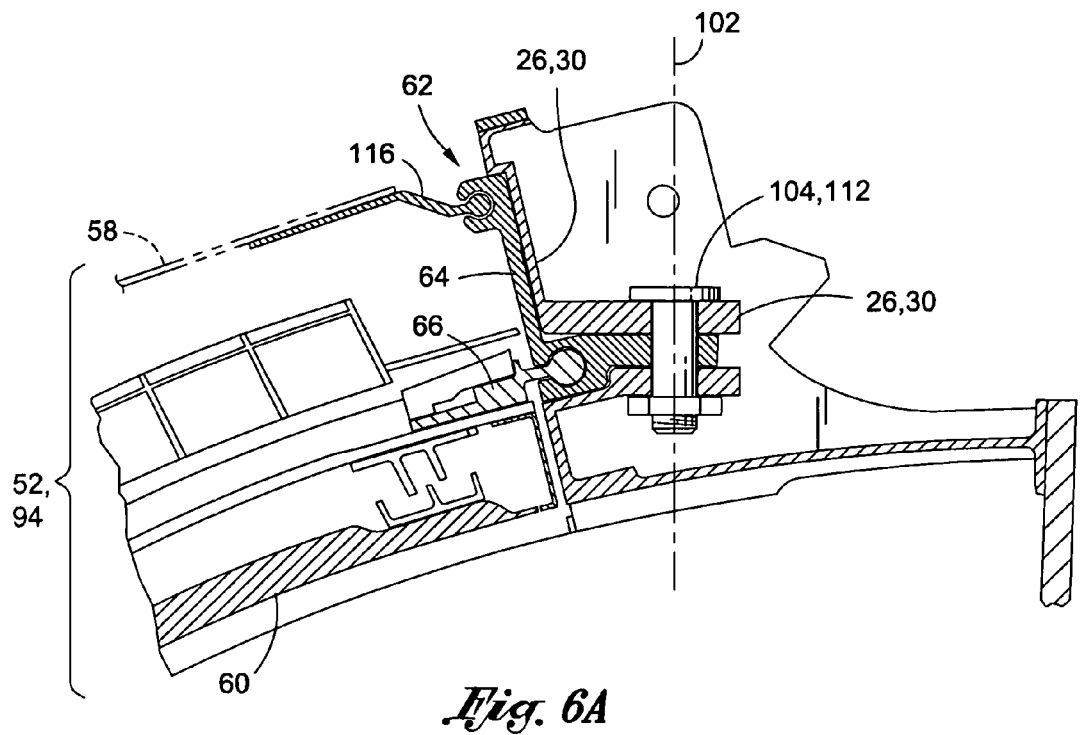
FIG. 6A is a sectional illustration of the nacelle taken along lines 6A-6A of FIG. 6 and illustrating a track beam that is pivotable relative to the hinge beam about a pivot axis and further illustrating the fan nozzle in the stowed position.
Figure 6B:
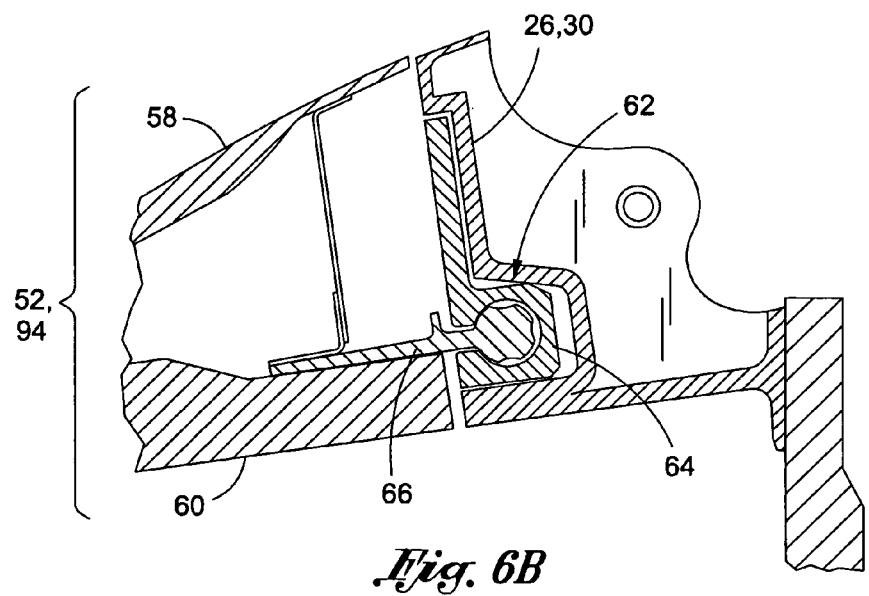
FIG. 6B is a sectional illustration of the nacelle taken along lines 6B-6B of FIG. 6 and illustrating a slider mechanism slidably coupling a slider beam to the track beam to facilitate axially aftwardly movement of the fan nozzle during thrust reversal.

For example, as shown in FIG. 6A, the slider beam 66 may include a slider beam tab 116 located adjacent a forward end of the slider beam 66 and to which the cowl outer panel 58 may be connected via a tongue and groove arrangement. As shown in FIG. 6B, the slider beam 66 may be coupled to the track beam 64 via a second tongue and groove arrangement to axially guide the fan nozzle 94 during aftwardly sliding motion thereof. FIGS. 6, 6A and 6B illustrate the fan nozzle 94 in the stowed position 108 wherein the track beam 64 is positioned adjacent to the pivot beam 30 with the fan nozzle 94 prior to outward pivoting.

Figure 7A:
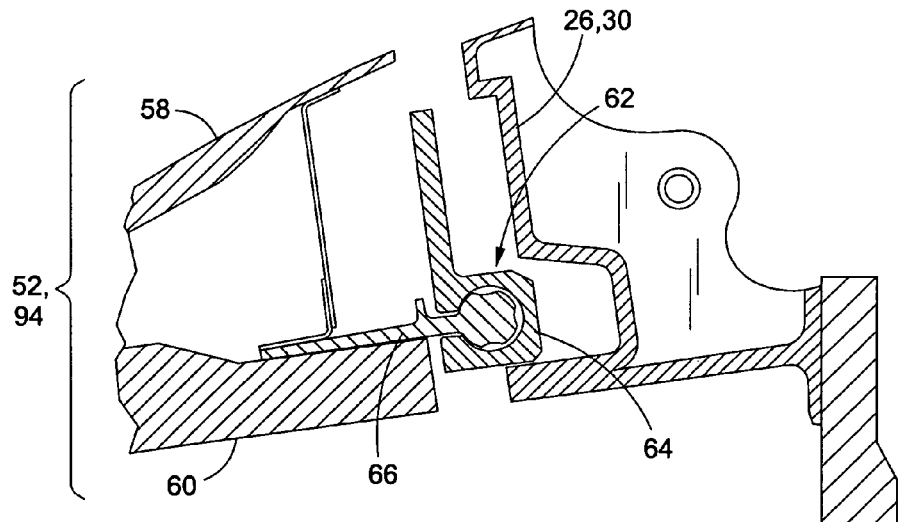
FIG. 7A is a sectional illustration of the nacelle taken along lines 7B-7B of FIG. 7 and illustrating the track beam pivoted away from hinge beam and further illustrating the slider beam coupled to the track beam to facilitate axially aftwardly movement of the fan nozzle.

FIGS. 7 and 7A illustrate the fan nozzle 94 in the deployed position 110 wherein the track beam 64 is pivoted away from the pivot beam 30. The track beam 64 is pivoted outwardly about the pivot axis 102 through a pivot angle α. As was earlier mentioned, the pivot axis 102 is shown as being located adjacent the nozzle forward edge 96 and extending through the pivot beam 30. However, it should be noted that the location of the pivot axis 102 as shown is exemplary only and is not to be construed as limiting alternative locations for the pivot axis 102. For example, the pivot axis 102 may extend through the track beam 64. Furthermore, it should be noted that the illustrations of the slider mechanisms 62 as tongue and groove arrangements known in the art are exemplary only and are not to be construed as limiting alternative configurations of other mechanisms which may facilitate linear translation of the fan nozzle 94.

For example, a screw drive actuation arrangement, as known in the art, may be provided to facilitate axially aftwardly motion of the fan nozzle 94 during thrust reversal actuation and thrust reversal retraction. Regardless of the particular configuration of the slider mechanism 62, the nozzle system 92 may be adapted to facilitate actuation and retraction of the thrust reverser 68 when the fan nozzle 94 is in the stowed position 108 as shown in FIG. 6 or when the fan nozzle 94 is in the deployed position 110 as shown in FIG. 7 or in any intermediate position. Furthermore, the fan nozzle 94 is configured such that axial movement may occur non-contemporaneously (i.e., non-simultaneously) with the pivoting of the fan nozzle 94.

As can be seen in FIGS. 6 and 7, the cascade segments 80 may be supported by the cascade support ring 78 at the aft end and by the bull nose 76 and torque box at the forward end of the cascade segments 80 as was mentioned above. The cascade support ring 78 and bull nose 76/torque box may be fixedly mounted to the hinge beam 26/pivot beam 30 such that the cascade segments 80 remain stationary when the fan nozzle 94 is pivoted outwardly and/or when the fan nozzle 94 is moved axially aft.

The pivoting movement of the fan nozzle 94 may be facilitated by a suitable nozzle pivot actuator 112. The nozzle pivot actuator 112 may be configured as a simple linear actuator which may be powered by a variety of different sources including electrical, hydraulic and/or pneumatic power and may be mechanically coupled to the fan nozzle 94 using a variety of coupling mechanisms including, but not limited to, screw drive, bell cranks or other coupling arrangements.

The nozzle pivot actuator 112 is preferably, but optionally, connected to the upper hinge beam 26/pivot beam 30 and is operative to move the track beam 64 rotationally about the pivot axis 102 between the stowed position 108 and the deployed position 110. A second nozzle pivot actuator 112 is preferably, but optionally, connected to the lower latch beam 28/pivot beam 30 to move the track beam 64 rotationally about the pivot axis 102 between the stowed position 108 and the deployed position 110. The two nozzle pivot actuators 112 at the upper hinge beam 26 and lower latch beam 28 cooperate to pivot the fan nozzle 94 between the stowed or deployed position 108, 110. A pivot stow latching device 118 may be connected to the upper hinge beam 26/pivot beam 30 to secure the fan nozzle 94 in the stowed position 108 during cruise flight operations. A second pivot stow latching device 118 is preferably, but optionally, connected to the lower latch beam 28/pivot beam 30 to secure the nozzle 94 in the stowed position 108 during cruise flight operations. The two pivot stow latching devices 118 at the upper hinge beam 26 and lower latch beam 28 cooperate to secure the fan nozzle 94 in the stowed position 108 during cruise flight operations.

Each one of the fan nozzles 94 may further include a pivot limiter 114 in order to limit or restrict the extent of outward pivoting of the fan nozzle 94. The pivot limiter 114 may be configured as a simple pin that may be slidably engaged within an arc-shaped groove. The slider mechanism 62 may also include guide mechanisms to maintain a desired orientation of the fan nozzle 94 slider mechanism 62 relative to the hinge beam 26 and latch beam 28 during outward pivoting of the fan nozzle 94. Aerodynamic seals (not shown) may also be utilized to prevent fan duct leakage during outward pivoting deployment of the fan nozzle 94.

Referring back to FIG. 4A, shown are the relative positions of the fan nozzle 94 in the stowed and deployed positions 108, 110 after pivoting of the fan nozzle 94 along a direction of pivot 106. The fan nozzle 94 in the stowed position 108 results in a fan duct nozzle throat area designated by $Ta_C$ which may be a desired position of the fan nozzle 94 where noise is not an issue such as during cruise flight. In contrast, the fan nozzle 94 in the deployed position 110 results in an increase in fan duct nozzle throat area designated by $Ta_T$ which may be a desired position of the fan nozzle 94 where noise reduction or high thrust is desired such as during takeoff. As shown in FIG. 4A, the outwardly pivotable fan nozzle 94 facilitates an increase in the fan duct nozzle throat area Ta with relatively little movement as compared to prior art variable area fan nozzle systems wherein the fan nozzle is purely axially translating.

For example, in one embodiment, the pivoting fan nozzle 94 as disclosed herein may advantageously provide two (2) to three (3) times the change in fan duct nozzle throat area Ta in the deployed positions 108 as compared to the change in fan duct nozzle throat area Ta that is available with purely axially translating prior art fan nozzles in the deployed position. Furthermore, depending upon the curvature of the fan duct inner wall 46, a purely aft-translating fan nozzle may be unable to achieve the amount of increase in fan duct nozzle throat area Ta that may be available using the fan nozzle 94 of the present disclosure due to clearance problems with other components of the aircraft 12 such as control surfaces (e.g., flaps) that may be mounted behind the engine propulsion system 10.

Advantageously, the relatively small amount of pivot angle α that is required to achieve a desired increase in fan duct nozzle throat area Ta may be accommodated by the mounting system of the thrust reverser actuator 70 and, in particular, by the thrust reverser actuator 70 gimbals and rod end 72 bearings. Likewise, outward pivoting of the fan nozzle 94 may be accommodated by the blocker doors 82 which remain essentially stationary and common to the bull nose 76 although an increase in the fan duct nozzle throat area Ta may cause slight movement of the blocker doors 82.

Furthermore, sealing mechanisms which may be installed between the translating sleeve 52 and the stationary fan cowl 40 may be accommodated during the relatively slight amount of outward pivoting of the fan nozzle 94 required to achieve the desired increase in fan duct nozzle throat area Ta. For example, pressure deck seals 88 mounted on the cowl inner panel 60 in contacting relation with the bull nose 76 may accommodate outward pivoting motion of the fan nozzle 94 when the thrust reverser is closed or non-actuated.

In a further embodiment, the fan nozzle 94 may be configured to be selectively pivotable to at least one of a plurality of predetermined positions between the stowed and deployed positions 108, 110. The predetermined positions may correspond to a particular operating parameter of the gas turbine engine 5 or to a flight parameter of the aircraft 12. In this regard, the desired fan duct nozzle throat area Ta may be achieved by selection of the amount of pivot angle α that satisfies the fan duct nozzle throat area Ta requirements. As such, the nozzle system 92 as disclosed herein provides an ability to tailor fan duct nozzle throat area Ta for a number of different engine operating conditions including a larger fan duct nozzle throat area $Ta_T$ for high thrust power settings during takeoff and a smaller fan duct nozzle throat area $Ta_C$ for lower cruise thrust power settings.

The present disclosure also provides a methodology for varying the fan duct nozzle throat area Ta of the gas turbine engine propulsion system 10. As was indicated above, the nacelle 16 may include the fan duct inner wall 46 and the fan duct outer wall 48 which may be disposed in radially-spaced relation to the fan duct inner wall 46. The fan nozzle 94 may define at least a portion of the fan duct outer wall 48. The method may comprise the step of pivoting the fan nozzle 94 outwardly relative to the longitudinal axis 18 (i.e., engine centerline) of the gas turbine engine 5. Furthermore, the method may comprise pivoting the fan nozzle 94 outwardly and inwardly between the stowed and deployed positions 108, 110 including selective positioning of the fan nozzle 94 at intermediate positions.

The method may further comprise the step of moving the fan nozzle 94 axially aft for thrust reversal actuation when the fan nozzle 94 is in at least one of the stowed and deployed positions 108, 110. Likewise, the method may comprise the step of moving the fan nozzle 94 axially forward for thrust reversal retraction when the fan nozzle 94 is in at least one of the stowed and deployed positions 108, 110. In this regard, the nozzle system 92 as disclosed herein facilitates thrust reverser 68 actuation or retraction capability when the fan nozzle 94 is in either the stowed or deployed position 108, 110 or in an intermediate position. In addition, the method may comprise moving the fan nozzle 94 axially non-contemporaneously with the outward pivoting of the fan nozzle 94. In this regard, the steps of moving the fan nozzle 94 axially and pivoting the fan nozzle 94 outwardly are not necessarily simultaneously performed but may be performed as separate operations.

The above description is given by way of example and not limitation. Given the above disclosure, one skilled in the art could devise variations that are within the scope and spirit of the embodiments disclosed herein. Furthermore, the various features of the embodiments disclosed herein can be used alone or in any varying combinations with each other and are not intended to be limited to the specific combinations described herein. Thus, the scope of the claims is not to be limited by the illustrated embodiments.

What is claimed is:

1. A nozzle system for a gas turbine engine having a longitudinal axis, the nozzle system comprising:
   a fan duct inner wall;
   a fan duct outer wall disposed in radially spaced relation to the fan duct inner wall; and
   a fan nozzle defining at least a portion of the fan duct outer wall and having a nozzle aft edge, the fan duct inner wall and the nozzle aft edge collectively defining a fan duct nozzle throat area, the fan nozzle being configured to pivot about a pivot axis oriented transversely relative to the longitudinal axis to vary the fan duct nozzle throat area;
   fan nozzle being configured to move axially independent of the pivoting of the fan nozzle.

2. The nozzle system of claim 1 wherein:
   the fan nozzle is configured to pivot outwardly and inwardly between stowed and deployed positions.

3. The nozzle system of claim 2 wherein:
   the fan nozzle is selectively pivotable to at least one predetermined position between the stowed and deployed positions.

4. The nozzle system of claim 3 wherein:
   the predetermined position corresponds to an operating parameter of the gas turbine engine.

5. The nozzle system of claim 2 wherein:
   the fan nozzle is configured to move axially aft for thrust reversal actuation and axially forward for thrust reversal retraction when the fan nozzle is in at least one of the stowed and deployed positions.

6. The nozzle system of claim 5 further comprising:
   a slider mechanism having the fan nozzle slidably mounted thereto to allow axial motion of the fan nozzle.

7. The nozzle system of claim 1 wherein:
   the fan nozzle has a nozzle forward edge;
   the pivot axis being positioned adjacent the nozzle forward edge.

8. The nozzle system of claim 1 wherein:
   the gas turbine engine has a pair of the fan nozzles defining a corresponding pair of bifurcated fan duct segments;
   the pair of fan nozzles being configured to pivot about a corresponding pair of the pivot axes to vary the fan duct nozzle throat area.

9. An aircraft having a gas turbine engine with a longitudinal axis, comprising:
   a nozzle system for the gas turbine engine, including:
      a fan duct inner wall;
      a fan duct outer wall disposed in radially spaced relation to the fan duct inner wall; and
      a fan nozzle defining at least a portion of the fan duct outer wall and having a nozzle aft edge, the fan duct inner wall and the nozzle aft edge collectively defining a fan duct nozzle throat area, the fan nozzle being configured to pivot about a pivot axis oriented transversely relative to the longitudinal axis to vary the fan duct nozzle throat area;
      fan nozzle being configured to move axially independent of the pivoting of the fan nozzle.

10. The aircraft of claim 9 wherein:
    the fan nozzle is configured to pivot outwardly and inwardly between stowed and deployed positions.

11. The aircraft of claim 10 wherein:
    the fan nozzle is selectively pivotable to at least one predetermined position between the stowed and deployed positions.

12. The aircraft of claim 11 wherein:
    the predetermined position corresponds to an operating parameter of the gas turbine engine.

13. The aircraft of claim 10 wherein:
    the fan nozzle is configured to move axially aft for thrust reversal actuation and axially forward for thrust reversal retraction when the fan nozzle is in at least one of the stowed and deployed positions.

14. The aircraft of claim 9 wherein:
    the fan nozzle has a nozzle forward edge;
    the pivot axis being positioned adjacent the nozzle forward edge.

15. The aircraft of claim 9 wherein:
    the gas turbine engine has a pair of the fan nozzles defining a corresponding pair of bifurcated fan duct segments;
    the pair of fan nozzles being configured to pivot about a corresponding pair of the pivot axes to vary the fan duct nozzle throat area.

16. An aircraft having a gas turbine engine with a longitudinal axis, comprising:

a nozzle system for the gas turbine engine, including:

a fan duct inner wall;

a fan duct outer wall disposed in radially spaced relation to the fan duct inner wall; and a fan nozzle defining at least a portion of the fan duct outer wall and having a nozzle aft edge, the fan duct inner wall and the nozzle aft edge collectively defining a fan duct nozzle throat area, the fan nozzle being configured to pivot about a pivot axis oriented transversely relative to the longitudinal axis to vary the fan duct nozzle throat area;

the fan nozzle including a cowl outer panel and a cowl inner panel disposed in radially spaced relation to the cowl outer panel;

the cowl outer and inner panels having at least one cascade segment radially disposed therebetween;

the cascade segment being configured to remain stationary when the fan nozzle is pivoted outwardly.

* * * * *